July 26, 1960 E. M. FISCHEL 2,946,539
GUIDANCE SYSTEM FOR LONG RANGE BALLISTIC MISSILE
Filed March 17, 1952 4 Sheets-Sheet 1

Fig. 1.

INVENTOR.
Eduard M. Fischel
BY
*G. J. Kesserich + A. W. Dew*
ATTORNEYS

July 26, 1960

E. M. FISCHEL

2,946,539

GUIDANCE SYSTEM FOR LONG RANGE BALLISTIC MISSILE

Filed March 17, 1952

INVENTOR.
Eduard M. Fischel
BY
G. J. Kessenich + A. W. Dew
ATTORNEYS

July 26, 1960

E. M. FISCHEL 2,946,539

GUIDANCE SYSTEM FOR LONG RANGE BALLISTIC MISSILE

Filed March 17, 1952

INVENTOR.
Eduard M. Fischel
BY
G.J. Kessenich + A.W. Dew
ATTORNEYS

United States Patent Office 2,946,539
Patented July 26, 1960

2,946,539
GUIDANCE SYSTEM FOR LONG RANGE BALLISTIC MISSILE

Eduard M. Fischel, Huntsville, Ala., assignor to the United States of America as represented by the Secretary of the Army Filed Mar. 17, 1952, Ser. No. 277,056

36 Claims. (Cl. 244—14)

(Granted under Title 35, U.S. Code (1952), sec. 266)

The invention described herein may be manufactured and used by or for the Government for governmental purposes without the payment of any royalty thereon.

This invention relates to guided-missiles of the long-range self-controlled type.

The principal objects of the invention are to provide:

(a) A missile capable of traversing a great circle course of the order of several thousands of miles along the trajectory of a Kepler ellipsoid, with a maximum elevation of perhaps a thousand miles.

(b) A misile wherein all controls are automatic once it has left the launching site.

(c) A missile wherein a base or platform is stabilized about and with reference to three mutually normal principal axes which, for convenience are identified as (1) the X-axis lying horizontally in the vertical plane of the aforesaid great circle trajectory, (2) the Y-axis defining the instantaneous vertical in said plane, and (3) the Z-axis normal to said vertical trajectory plane.

(d) A missile wherein the acceleration forces originating within the missile itself and parallel to the aforesaid axes, are twice integrated with respect to time, once to give the velocity components along or parallel to the respective principal axes, and again to give the total distance traversed therealong.

(e) A missile wherein the total travel along the X- and Z-axis are divided by a factor proportional to the distance traversed along the Y-axis to give factors of total angular travel in the vertical planes through the respective Y- and Z-axes, about the earth's center.

(f) A missile having a path simulator geometrically representing the earth, the pre-computed missile trajectory, the instantaneous position of the missile therealong during flight, together with means for constantly adjusting the angular and linear values whereby any deviation of the actual missile effects a corresponding deviation of the simulator which deviations are sensed and used to effect necessary corrections to maintain the missile in and along its precomputed trajectory.

(g) A missile wherein a computer operated in accordance with paragraph (d) supra modifies or adjusts the introduced factors of acceleration to compensate and correct for errors otherwise introduced by variations in gravity acceleration with height or distance from the earth's center, Coriolis acceleration, and centrifugal acceleration of the missile's total travel.

(h) A combination of path or trajectory simulator as in paragraph (f) and computer as in paragraph (g) wherein the output values of $\omega_x$, $y$ and $\omega_z$ of the computer are applied to the simulator to directly control the parts thereof and cause the latter to sense any deviations of the actual missile from the pre-computed trajectory.

(i) The combination of the stabilized base of paragraph (c) with the computed of paragraph (g) wherein the computed values of angular travel about the earth's center in the vertical great circle plane and in the vertical plane normal thereto, are applied to the stabilized base to assure that the platform of the acceleration responsive means is maintained normal to the instantaneous vertical throughout the flight path.

(j) The combination of paragraph (c), (f) and (g), presenting a completely integrated, self-contained guided missile control which is not susceptible to jamming by enemy control and which is guided under its own momentum after cut-off of the last booster stage, into a pre-selected remote target.

(k) A method of controlling the missile by force generated within the missile, to maintain it upon the pre-selected trajectory while proceeding under momentum only.

(l) A method of guiding a missile proceeding under momentum only, to compensate for errors otherwise introduced by earth rotation due to deviations of the missile from pre-computed velocity.

Other objects and advantages of the invention will be obvious or will readily occur to those skilled in the art after a study of the following specification, in connection with the accompanying drawing.

THE INVENTION IN GENERAL

My system embraces a comprehensive completely integrated control for guided missiles having a maximum range of several thousands of miles, and which is completely autonomous after launching and hence incapable of being "jammed" by enemy action.

A gyro-stabilized frame is mounted for pivotal movement about two mutually normal axes within a platform. The two axes are maintained parallel, respectively, with the X-axis, that is, the horizontal line in the vertical plane through the missile's trajectory, and the Z-axis, that is, a line normal to the aforesaid vertical plane. The frame is universally mounted by gimbal means on or within the missile for universal pivotal movement about three mutually-normal axes. The aforesaid frame is "normally" rigidly connected with the innermost one or "platform" of the supporting rings or members of the gimbal means, by irreversible gear drives, each under control of a respective driving motor, so that the frame and innermost gimbal move as a unit except when one or both of the driving motors are energized. Three reversible torque motors are connected with the aforesaid gimbal means and each is effective, when energized, to apply a torque, in one direction or the other, about a respective gimbal axis. Energization of each of these three torque motors, or torquers, is under control of a respective one of the three control gyroscopes mounted upon the frame. Each of these gyroscopes is a two-degree-of-freedom, rate responsive instrument and each precesses in one direction or the other in response to incipient angular movement about a respective one of the aforesaid gimbal axes, to operate pick-offs which, in turn, control the corresponding torque motor.

Three accelerometers are carried by the aforesaid platform or innermost gimbal member. Each accelerometer is constructed and arranged to produce an output voltage proportional to component accelerations of the missile along a respective one of three axes, two of which have been previously identified as the X- and Z-axes. The remaining or Y-axis is the instantaneous vertical. The outputs of the accelerometers are introduced into respective X-, Y- and Z-sections or components of an integrating computer which effects a double integration of each input to produce voltages proportional to (a) velocity component and (b) distance traveled, along the respective axes. The second integral of the Y-component is treated to produce an output of instantaneous distance from earth's center which is combined with the second integral of the X- and Z-components to produce measures of angular movement about the earth's center in the vertical planes through the corresponding X- and Z-axes. These values are conveyed back to the stabilized base to control the aforementioned driving motors whereby the frame is maintained in fixed angular relation with the instantaneous vertical throughout the flight. Still referring to the computer, the measures of angular movement in the X- and Z-components are modified by the velocity output of the Y-component, to give Coriolis acceleration corrections in the form, for example, $2\dot{y}\omega_z$ which are used to modify the inputs from the respective accelerometers.

Centrifugal acceleration corrections from each of the outputs of the X- and Z-computer sections are applied to modify or correct the input to the Y-component, in the component form $\dot{x}\omega_x$ and $\dot{z}\omega_z$. A gravitational acceleration factor, is also introduced as a correcting input to the Y-section in the form $g = g_0(R_0/R)^2$ where $R_0$ and $g_0$ are the values at the launching site and R is the instantaneous radial distance.

A path simulator represents to scale and angular relations, the earth's polar axis, and one or more meridians over arcs including the trajectory. A pattern of the precomputed trajectory along the great circle path between launching site and target is secured in proper relation with respect to the polar axis. The pattern is rotated by clockwork or time-controlled mechanism at the same rate as the earth. Feeler or pick-off mechanism are controlled by three motors incorporated in the path simulaor and are moved thereby over the pattern. These motors are controlled by outputs from the computer, in co-operation with the stabilized base, in accordance with angular movement about the earth's center in the mutually normal vertical planes containing the X- and Z-axes; and in the case of the Y-axis, in accordance with changes in altitude relatively to that of the launching site. Any discrepancy between the actual and computed positions is detected by the pick-offs, and applied to external controls of the missile to restore it to the desired trajectory.

*The rocket-trajectory path simulator*

Figure 1:
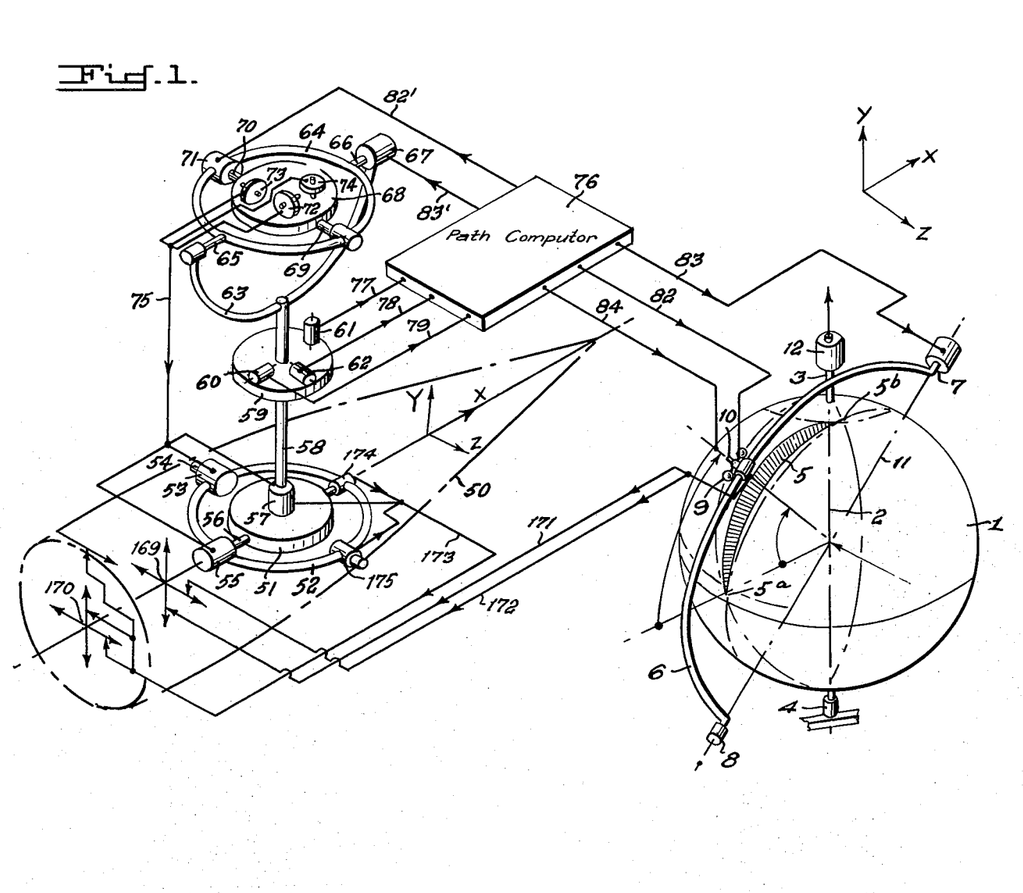
Figure 1 is a schematic lay-out of the missile showing schematically the stabilized base or platform, the computer, the path simulator, and the electrical connections and controls between the several components.
Figure 2:
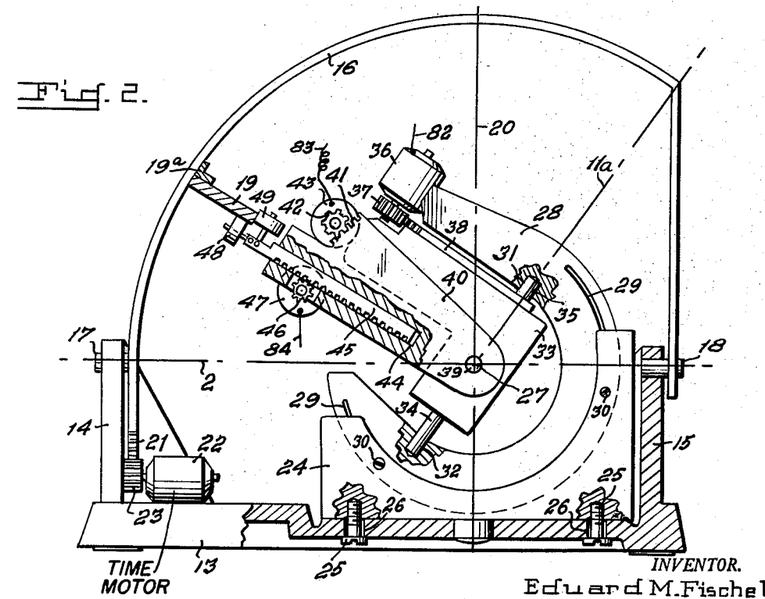
Figure 2 is a detail view, partly in section, of a preferred embodiment of the missile path simulator.

The rocket trajectory path computer simulates to scale the polar axis of the earth and the actual predetermined trajectory of the missile as regards latitude and heading with respect to the polar axis. Figure 1 illustrates diagrammatically the principle of operation of this portion of the invention while Figure 2 shows the preferred form of the actual equivalent embodiment.

In Figure 1, numeral 1 identifies a sphere which represents the earth and which is mounted for rotation about an axis 2, as by upper and lower bearings generally indicated at 3 and 4, and rotated by clockwork 12 at the same angular rate as the earth. A pattern 5 of metal or other rigid material has an inner edge conforming in curvature to that of the model earth 1, and an outer edge conforming in scale with that of the model earth and representing the desired path or trajectory of the missile both in radial dimensions, representing the successive altitudes of the missile and the total distance or angular degrees between the launching site, hereinafter simply called "site," and the remote target. The pattern 5 is fixed to model 1 along the great circle path between the site and target with one terminus, for example 5a at the point upon the model earth representing the site, and the other 5b at the point representing the target.

A half-ring or bail 6 is pivoted by aligned bearings 7 and 8 defining that diameter 11 of the earth model 1 lying in the plane of the aforesaid great circle and normal to that radius containing the mid-point of the trajectory. A carriage 9 is mounted on bail 6 for substantially frictionless sliding therealong. This carriage has means embracing the pattern so that the bail and pattern are maintained coplanar. A slide or feeler 10 is mounted in carriage 9 for sliding along the radius of the model 1 at the instantaneous position of the carriage. The slide has its inner end held in contact with the adjacent edge of pattern 5 so that the radial position of the slide at all times represents to scale the proper altitude above earth of the rocket path or trajectory. The slide, of course, or more specifically, its end in contact with pattern 5, represents the rocket position with respect to the earth model as to latitude, longitude, and altitude.

By means subsequently described the carriage 9 is moved along bail 6 at the same angular speed about the center of model 1 as the actual rocket about the center of the true earth. Model 1 is rotated about its axis at the same angular speed as the true earth. Therefore, any incipient deviation of the inner end of feeler 10 from the plane of pattern 5 represents a corresponding deviation of the actual rocket from its true or desired trajectory and followup contacts or pick-offs between the feeler and patthern are actuated to operate controls of the rocket to return it to the desired path. Likewise the radial position of feeler 10 as it remains in contact with the effective or trajectory edge of the pattern, is a scalar measure of the altitude of the actual missile and may be utilized to control it accordingly.

The path simulator shown upon Figure 1 is a simplified version for explanation only. Figure 2 shows one practical embodiment of the path simulator and differs from Figure 1, only in that the part representing the earth is external. All angular and linear values introduced into or detected by the instrument are the same as in Figure 1.

In Figure 2, 13 is a generally circular base having upstanding brackets 14 and 15 with aligned openings defining polar axis 2. A portion of a meridian of the earth is represented by an arcuate bail or meridan bar 16 journaled for pivotal movement about axis 2, by trunnions 17 and 18. A pattern 19, corresponding in purpose and function with pattern 5 of Figure 1, is secured to meridian bar 16 by any suitable means, generally indicated at 19a. It will be understood that the arcuate dimension of ring 16 will depend upon the difference in latitude between the launching site and the target or, more generally, upon the greatest possible change in latitude which can be effected by the maximum distance which the missile is capable of traversing. Thus, for example, the bar 16 has an angular extent of about 126° extending from the north end of the polar axis at 17 to about 36° south latitude and would be suitable for a missile capable of traversing 72° of latitude or a maximum range of about 5000 miles. Thus dash line 20, Figure 2, represents the plane of the equator which, in the figure, is normal to the plane of the sheet.

Ring 16 has a gear segment 21 fixed to an end thereof below polar axis 2 and coaxial therewith. A clockwork or timing motor 22 is fixed to base 13 and has a gear 23 on its shaft in mesh with segment 21. By this construction ring 16 may be pivoted about polar axis 2 at the same angular rate as the earth. It will be understood that to simulate trajectories lying in the southern hemisphere it will be necessary merely to reverse the direction of turning of motor 22.

A turret 24 is mounted on base 13 for pivotal adjustment about an axis 20. This adjustment may be effected after loosening of screws 25 which extend through arcuate slots 26 in base 13 concentric of axis 20. Tightening of the screws fixes the turret in adjusted position. The intersection of axis 2 with axis 20 is, of course, the simulated center 27 of the earth. Turret 24 is provided with a track or channel concentric of point 27. A generally horse-shoe shaped slide or yoke 28 is shaped to fit the channel in turret 24 for angular adjustment about point 27. The slide has slots 29 concentric of point 27 and can be fixed in adjusted position by screws 30 passing through holes in turret 24 and the respective slots 29.

Slide 28 has diametrically opposed aligned bores 31 and 32 defining an axis 11a and which passes through point 27 normal to the great circle plane of pattern 19. A part 33 has aligned trunnions 34 and 35 journaled in the respective bores for pivotal adjustment about axis 11a. Adjustment is effected by a motor or repeater 36 having a pinion 37 on its shaft and in mesh with a gear sector 38 fixed to or integral with, part 33. Thus, when slide 28 is set with axis 11a normal to the plane of pattern 19, and motor 36 is driven in accordance with the computed angular speed of the actual rocket about the earth's center, part 33 is rotated about axis 11a to reverse the trajectory pattern or cam, as subsequently described.

Part 33 has a trunnion 39 extending therefrom on an axis concurrent with and normal to axis 11a at point 27. A sensitive element 40 is journaled on this trunnion for pivotal motion only about that axis, normal to the plane of Figure 2, through point 27. Element 40 is provided with a gear segment 41 coaxial of the axis of trunnion 39. This segment meshes with a pinion 42 upon the shaft of a telemetric repeater 43 carried by part 33. Therefore, operation of motor or repeater 43 under control of the subsequently-described computer adjusts element 40 relatively to part 33 about trunnion 39; and any such movement effecting a relative angular adjustment between element 40 and pattern 19, is used to convey a control signal to the appropriate rocket-control mechanism, all as subsequenly described.

The central plane of pattern or cam 19 is radial of meridian ring 16 and thus passes through point 27. Element 40 has a radial bore 44 parallel with the aforesaid plane to slidably receive a rack or slide 45 in mesh with the pinion 46 of a second telemetric repeater 47 fixed upon element 40. A pair of contact rollers 48 and 49 are journaled upon rack 45 on mutually normal axes. Roller 48 engages one side of pattern 19, while roller 49 engages the edge thereof. Spring means not shown, are provided to urge rack 45 radially outwardly to maintain roller 49 in contact with pattern 19. Likewise, spring means, also not shown, are provided to urge element 40 clockwise, as viewed in Figure 2, about trunnion 39, to thereby maintain roller 48 in contact with the side of pattern 19.

By this construction, as motor 22 rotates meridian ring 16, repeaters 36, 43 and 47 are driven from the computer in accordance with (1) the angular movement of the missile about the earth's center in the vertical plane of the trajectory, (2) the angular movement of the missile about the earth's center in the transverse vertical plane and (3) the change in distance from the earth's center along the instantaneous vertical, respectively. These movements are compared with the corresponding movements of the feeler mechanism over and along pattern 19, and any deviation or lack of correspondence is detected and used to create a corrective signal. The manner in which pattern 19 is milled or cut will now be described in connection with Figure 6.

*The path pattern cutter*

It has previously been stated that the path of the missile is a Kepler ellipsoid. The physical size and shape of the pattern 19 will be determined by numerous factors including physical size of the path simulator, particularly the radius of meridian ring 16, the angular extent of the missile's trajectory about the earth's center, and the maximum altitude of the trajectory.

Figure 6:
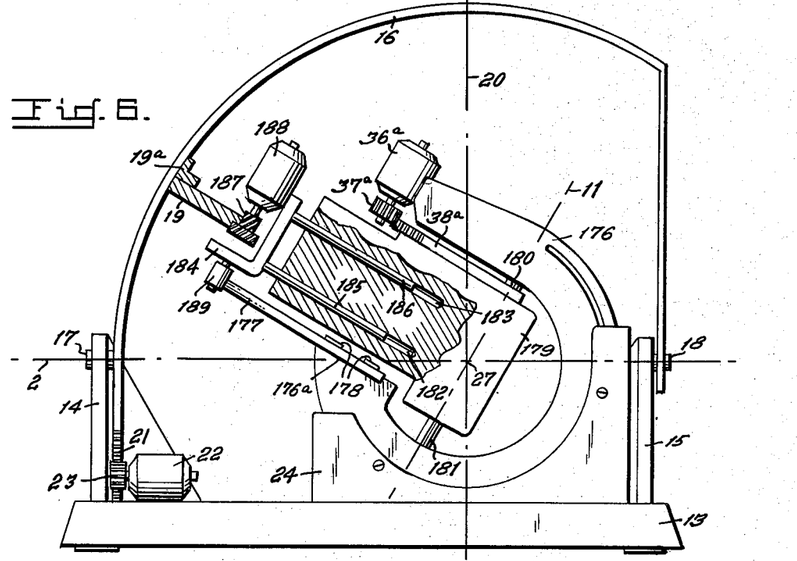
Figure 6 is a view, partly in section, showing the mechanism for, and manner of, cutting or forming a trajectory cam.

Figure 6 shows how the pattern may be formed in situ, wherein several of the parts may be the same previously described in connection with Figure 2. Hence, as to these parts it is sufficient merely to identify base 13, brackets 14 and 15, meridian ring 16, trunnions 17 and 18, pattern piece 19, segment 21, timing motor 22, gear 23, and turret 24. For convenience there are also identified simulated polar axis 2, simulated earth's center 27, and trace of equatorial plane 20.

U-shaped slide 176 is generally similar to its counterpart shown upon Figure 2, but is formed to provide a rigid support at 176a for a pre-formed cam or guide 177 of suitable rigid material secured to slide 176 by screws 178. Motor 36a, rigidly fixed to slide 176, and its drive pinion 37a and sector 38a may be identical with the correspondingly identified parts upon Figure 2, as previously described. However, sector 38a is secured to a special mount 179 pivoted by trunnions 180 and 181 in slide 176, about axis 11 normal to the great circle plane of the trajectory pattern through point 27.

Mount 179 has parallel bores 182 and 183 whose axes determine a plane through axis 11 and hence normal to the trajectory pattern. A slide 184 has rods 185 and 186 fitting the respective bores and carries a milling cutter 187 driven from any suitable source of power, shown as a motor 188. The slide also has an anti-friction roller 189 held in contact with the pre-formed edge of guide 177, by a spring, not shown, which urges rods 185 and 186 inwardly along their bores.

In operation, the arcuate uncut pattern having its edge roughly conforming to the desired trajectory, is secured in position to ring or rings 16 in accordance with the known great circle path between the launching site and target. The cutter 187 is positioned at one terminus of the trajectory as represented upon pattern 19, and motors 22, 36a and 188 are energized. The speed of motor 36a is related with that of motor 22, according to the equation derived from the second law of Kepler:

$$w = V_\text{h} \cdot \frac{R_0}{R^2}$$

where $V_\text{h}$ is the horizontal velocity component at combustion cut-off (a constant), $R_0$ is the radial distance from missile to the center of the earth at cut-off, and $R$ is the instantaneous distance, missile to earth's center. The machine picks up R from the cam 177 and, as the speeds of motors 22 and 36a are related and controlled in accordance with the above equation, the edge and an adjacent portion of one face of the pattern are finished to precise form. Thereafter, slide 176 and all parts carried thereby, are removed, and slide 28 is substituted to complete the set-up shown upon Figure 2 and previously described. As subsequently described under the section dealing with operation, the actual spatial position of the missile is continuously computed, transferred to the path simulator, compared therein with the trajectory as determined by the pattern or cam 19, and any deviations between the actual and computed positions are used to restore the missile to the pre-computed great circle trajectory. As the controls are very sensitive and operate smoothly and continuously, the missile is held to the desired trajectory without substantial deviation.

*The gyro-stabilized platform*

The invention comprehends a gyro platform stabilized about three mutually normal coordinate axes which are identified as X, Y and Z. The X-axis is taken as parallel with the direction of flight, the Y-axis as the instantaneous vertical and the Z-axis perpendicular to the X- and Y-axes, namely horizontally transverse to the direction of flight. The component accelerations of the missile along these three axes are detected and measured by respective accelerometers. The respective accelerations along the X and Z axes are integrated to give true component velocities along those axes, which are again integrated to give distances traveled in terms of angular values about the earth's center. Certain of these values are then applied to the path simulator previously described to control the same and provide the basis for any necessary corrections in flight.

Figure 1 shows the stabilized base schematically, wherein 50 indicates the missile frame or casing with principal axes X, Y and Z as previously identified. A base indicated at 51 is mounted by a gimbal 52 for pivotal movement about the X-axis. Gimbal 52, in turn, is mounted in the missile for pivotal movement about the Z-axis. A torque motor 53 is associated with one of the trunnions 54 defining the Z-axis and when energized, applies a torque to gimbal 52 about this axis. Gimbal 52 carries a torque motor or "torquer" 55 having its shaft or armature connected with one trunnion 56 of base 51 whereby, on energization in proper phase, a torque is applied to base 51 about the X-axis. Base 51 carries a third torque motor 57 which, when energized, applies a torque to a column or support 58 rotatable upon and relatively to base 51 about the Y-axis.

A reference platform 59 is fixed to column 58 and supports three accelerometers 60, 61 and 62, of known type and construction, and responsive, respectively, to component accelerations along the X-, Y-, and Z-axes. For example, these accelerometers may be of the capacitive pick-off type wherein a mass, mounted for translation along the axis of sensitivity by a frictionless air bearing, is constrained along that axis by a spring. The mass may carry one or more capacitor plates whose separation from fixed counterpart plates varies with the intensity of acceleration along the aforesaid axis. The resulting variation in capacity is utilized by circuitry well known in the art to generate a signal voltage proportional thereto for amplification and integration. Column 58 carries a yoke 63 at its upper end in which a gimbal 64 is journaled by trunnions 65 and 66. A positioning motor 67 is carried on yoke 63 and when energized operates through an irreversible reduction gear drive, not shown, to apply a movement to gimbal 64 about the X-axis. A gyro frame 68 is pivoted in gimbal 64 by trunnions 69 and 70, for angular movement about the Z-axis. A second positioning motor 71 is carried by gimbal 64 and has its shaft coupled by an irreversible reduction gear drive, not shown, to trunnion 70 whereby upon energization of motor 71, a movement is applied in one direction or the other, to frame 68.

Frame 68 carries three gyros 72, 73 and 74 which stabilize the frame in space. All gyros are two-degree-of-freedom instruments with mutually normal intersecting spin and precession axes. The center of gravity of each machine is at the intersection of the axes. In other words, they are in neutral equilibrium and depend upon the moments of inertia of their rotors to maintain their spin axes fixed in space. The spin axes of all three gyros is horizontal but whereas those of 72 and 73 are transverse, that is, parallel to the Z-axis, that of gyro 74 is parallel to the X-axis. The precession axis of gyro 72 is parallel with the X-axis while those of 73 and 74 are parallel with the Y-axis, that is, vertical. Each gyro controls a pick-off which is responsive to precession about its precession axes and controls the energization of torque motors 57, 55, and 53 respectively, as indicated generally by circuit connections 75.

The path computer is indicated schematically at 76. Leads 77, 78 and 79 electrically connect the accelerometers 61, 62 and 63 with the computer to introduce therein voltages proportional to any acceleration components along the respective coordinate axes. As will be subsequently described, the computer effects a first integration of the respective acceleration voltages and provides outputs of (1) angular velocity about the earth's center along the X-axis ($\omega_x$) and, (2) angular velocity about the earth's center along the Z-axis ($\omega_z$) and (3) instantaneous altitude as a function of distance from the earth's center at launching plus the difference between the instantaneous altitude and that at launching.

Computer 76 applies a voltage over line 82' to torque motor 71 proportional to the angular velocity of the missile about the earth's center in the vertical plane through the X-axis. The computer also applies a voltage over line 83' to torque motor 67 proportional to the angular velocity of the missile about the earth's center in the vertical plane containing the Z-axis. These voltages energize motors 67 and 71 to cause them to operate at rates which will maintain platform 68 angularly fixed in space, as will be subsequently described. Voltages proportional to the aforesaid values of $\omega_x$ and $\omega_z$ are transmitted from computer 76 over lines 82 and 83, respectively, to the path simulator. Voltages proportional to Y or instantaneous altitude are transmitted over line 84 to the path computer.

Figure 4:
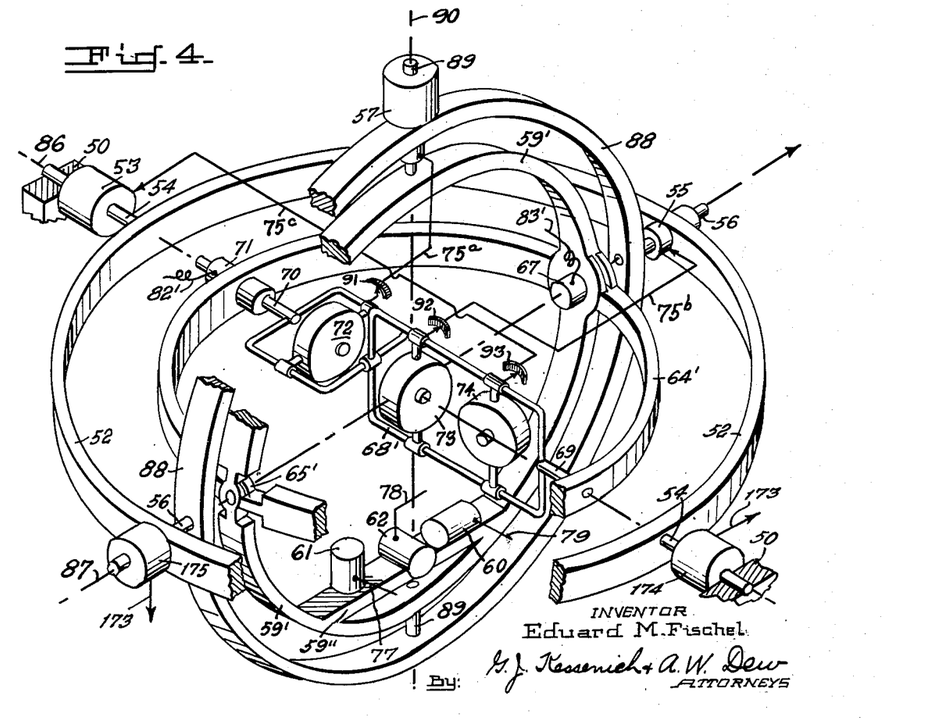
Figure 4 is an isometric perspective of the gyroscopically stabilized platform and accelerometers carried thereby.

Figure 1 shows the stabilizer parts schematically for greater ease of description and understanding. Figure 4 shows a practical embodiment wherein parts which are or may be identical with those shown in Figure 1 are identified by like reference numerals and wherein equivalent parts are identified by the same reference numerals, primed, as have been used to designated corresponding parts in Figure 1.

Referring specifically to Figure 4, 50 represents a part of the missile frame or casing having aligned bearings supporting, the trunnions 54 of gimbal 52. As in Figure 1, torque motor 53 is connected with the adjacent trunnion 54 in a manner, when energized, to apply a torque about the transverse or Z-axis 86. Gimbal 52 supports trunnions 56 one of which forms the shaft of torque motor 55 so that, when energized, a torque is applied about the normally horizontal fore and aft axis 87. Trunnions 56, in turn, support a normally vertical gimbal 88 which has trunnions 89 supporting a platform ring or gimbal 59'. Gimbal 88 and its upper trunnion, are associated with torque motor 57 in a manner such that energization thereof applies a torque to gimbal 59' about the normally vertical axis 90. At its lower portion, gimbal 59' has a support 59'' for the three accelerometers 60, 61 and 62, previously described in connection with Figure 1.

Gimbal 59' has bearings, only one of which, 65', is shown upon Figure 4 and which support a gimbal 64' for pivotal movement about an axis normal to axis 90 and, as the parts are shown upon Figure 4, coincident with axis 87. Torque motor 67, also shown at Figure 1, is so related with gimbals 59' and 64' that, upon energization it applies a torque to gimbal 64' about the axis of trunnions or bearings 65'. A gyro frame 68' is supported by trunnions 69 and 70 within gimbal 64' for pivotal movement about the common axis which, in Figure 4, is shown coincident with axis 86.

Frame 68' carries and supports the three gyroscopes 72, 73 and 74. From Figure 4 it is noted that all three gyros are neutral, two-degree-of-freedom instruments with normally horizontal spin axes and precession axes normal to the respective spin axes. Thus, the spin axes of gyros 72 and 73 are parallel but their precession axes are horizontal fore and aft and vertical respectively, while gyro 74 has its spin axis fore and aft and its precession axis vertical.

Each of the aforesaid gyros has a pick-off responsive to or controlled by angular movement about its axis of precession. Thus, gyro 72 controls pick-off 91 to thereby control motor 57 over line 75a, gyro 73 has a pick-off 92 to effect control of motor 55 over line 75b, and gyro 74 has pick-off 93 to control torque motor 53 over line 75c. It will be understood that gyro rotors are spun by electrical or pneumatic means not shown. The aforementioned pick-offs may be of any known type of high sensitivity. For example, each may comprise a pair of segmental contacts insulated from each other and fixedly carried upon frame 68', and a contact arm movable over and in contact with one or the other of the segments in accordance with the direction of precession. Thus, for example, incipient angular movement of gyro 72 about the vertical axis normal to its precession axis in one direction will move its contact arm onto one segment of pick-off 91 and cause energization of motor 57 in a direction which, through rings 59' and 64', and frame 68' will apply a torque to gyro 72 in a direction which will annul the precession whereby ring 59' and the parts carried thereby are stabilized in azimuth. It has been previously explained that the drive effected by motor 67 between rings 59' and 64' is irreversible. Consequently, when motor 67 is de-energized these rings are secured together as a unit. Thus incipient angular movement of rings 88, 59' and 64' about axis 87 of trunnions 56, cause a precession of gyro 73 in a corresponding direction which is detected by pick-off 92 and causes energization of torque motor 55 in a direction to annul the movement. Finally, any incipient angular movement of rings 52, 88, 59', and 64', about axis 86, causes a corresponding precession of gyro 74 which is detected by pick-off 93 to effect energization of motor 53 in a direction to annul the angular movement. It will be recalled that the reduction gear drive between motor 71 and trunnion 70 is irreversible so that when this motor is de-energized, frame 68' and ring 64' are connected for angular movement as a unit.

The path computer

By the construction previously described in connection with the section dealing with the stabilized platform, support 59'' is at all times maintained horizontal and fixed in azimuth. Hence accelerometers 60, 61 and 62 are responsive only to the respective mutually normal component accelerations, that is, accelerations caused by booster propulsion and lateral rocket control. All other accelerations which influence or affect the trajectory, such as gravitational and centrifugal, have no effect upon the accelerometers and the influence of such forces upon the trajectory is introduced in the computer. In the reference system used, the vertical or Y coordinate is always directed to the center of the earth, and the X and Z coordinates are respectively parallel and horizontally lateral to the course. The system selected is one in which the rocket has relative motion in the radial direction only. Consequently, the introduction of one imaginary force only is necessary for the determination of the trajectory; and this force lies coaxial with the horizontal component of the rocket's velocity. Gravitation, centrifugal and Coriolis forces and the initial spatial position at launching, determine the undisturbed trajectory. The direction of the first two mentioned forces remains at rest. The Coriolis force changes sign with that of Y. All other forces are measured by the accelerometers.

Figure 5:
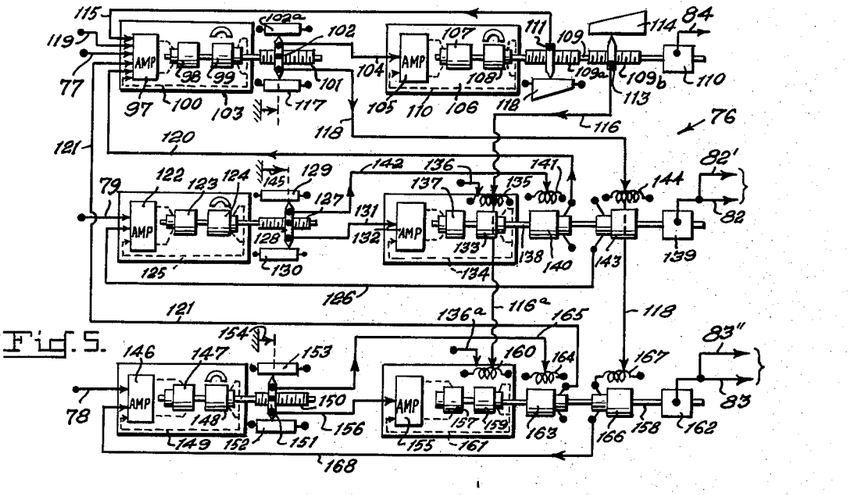
Figure 5 is a diagrammatic view showing the implementation of the computer and the interconnections between the component parts thereof.

As the missile climbs from the launching site, the vertical component of acceleration affects accelerometer 61 which produces an output potential proportional to the acceleration and applies the same to high-gain amplifier 97 of a first stage integrator, identified by numeral 103, Figure 5, by way of lead 77. The output of the amplifier is applied to a motor 98 which is direct connected with a D.C. generator 99 having constant excitation. As indicated at 100, the output of generator 99, is fed back to amplifier 97 in opposition to the input bias so that a net or resultant voltage remains which voltage, although small, is large enough to enable the high-gain amplifier to turn the motor. Since the relationship between the voltage from accelerometer 61 and the rotation of motor 98 is linear, the total rotation thereof is proportional to the time integral of the voltage and correctly represents the vertical velocity component of the missile.

Motor-generator unit 98, 99 is direct-connected to a threaded shaft 101 having the potentiometer slider 102 thereon movable over potentiometer 102a. As the potentiometer winding is linear the potential established thereby is proportional to the time integral of vertical acceleration, that is, the vertical velocity component of the missile. This component is introduced by lead 104 to the amplifier 105 of a second stage integrator 106. As this integrator stage may be similar in principle to first stage 103, it is sufficient to identify motor 107, coupled generator 108, direct-connected shaft 109 and feedback connection 110. The rotation of shaft 109 therefore is proportional to the total vertical travel of the missile and, when algebraically added to $R_0$, the elevation of the launching site or distance from the earth's center, gives the instantaneous radial distance from the earth's center. Shaft 109 is coupled to and drives a self-synchronous transmitter 110 connected by lead 84 with repeater 47 at the path simulator, previously described. It will be understood that the single lead 84 is symbolic merely of the standard three-phase connection used in such telemetric transmitter-repeater systems.

Shaft 109 has two threaded portions 109a and 109b. Portion 109a has the slider 111 of a non-linear or "$\Delta g$" potentiometer 112 connected for actuation thereby. Portion 109b has the slider 113 of a second non-linear or "$y$" potentiometer 114 connected for actuation thereby. As shown upon Figure 5, the potential taken off by slider 111 is introduced as a negative value by lead 115, into amplifier 97 as a function of $\Delta g$, $[g=f(1/R)]$, that is, the decrease in gravitational acceleration due to the total instantaneous increase in altitude of the missile over that at the launching site. The potential taken off by slider 113 is applied by lead 116 to the field coils of one of the Z-component integrators as and for a purpose subsequently described.

It is also noted at this point, that potentiometer slider 102 has a second contact moving over a winding 117 to vary over lead 118 the voltage applied to the field coils of a generator in the X-component integrators, also subsequently described.

The following values are introduced into amplifier 97, as indicated in Figure 5, first, the Y-component of acceleration over lead 77, as previously described; secondly, a constant potential over lead 119 proportional to the value of $g$, or gravity acceleration at the launching site; thirdly a potential over lead 115 proportional to the decrease in the value of $g$ with altitude and which is subtracted from the aforesaid potential introduced over lead 119; fourthly a potential derived from the X-component integrators over lead 120 and proportional to $\dot{x}\omega_x$ and lastly, a potential derived from the Z-component integrators over lead 121 proportional to $\dot{z}\omega_z$. The two last-named values are the components of the centrifugal acceleration of the missiles total travel. The five potentials are combined in the amplifier 97 and their algebraic sum, less the output of generator 99, is amplified and used to effect operation of motor 97. It is noted at this time, that the field excitations of generators 99 and 108 are constant, as indicated at Figure 5.

The X-component integrators are in general similar to the corresponding integrators of the Y-component, just described, with certain exceptions to be described. Thus the input voltage from accelerometer 60, proportional to the horizontal acceleration along the missile's path, is applied by line 79 as an input to amplifier 122 and the amplified output is applied to motor 123 to drive generator 124 having constant field excitation. As in the case of generator 99, the output is fed back by line 125 to the amplifier and subtracted from the input over line 79. Also, as in the case of the Y-component previously described, the relationship between the input voltage and speed of rotation of the motor, is linear, so that the total rotation represents the time integral of the input voltage as a measure of the X-component or velocity of the missile. Another input voltage over lead 126 is introduced proportional to $2\dot{y}\omega_x$ as a Coriolis acceleration as subsequently described.

Motor 123 drives a threaded shaft 127 which adjusts the double-contact slider 128 of potentiometers 129 and 130. The potential determined by 130, which is proportional to $\dot{x}$, that is, the forward speed of the missile, is applied by lead 131 to a second amplifier 132 whose output actuates a motor 137 to drive a generator 133 the output of which is fed back to the amplifier by connection 134. However unlike generators 99, 108 and 124, the field excitation is not constant, but is provided by coils indicated at 135 having taps whereby the field excitation is varied (a) from line 136 by a potentiometer, not shown, preset proportional to the elevation or altitude of the launching site ($R_0$) which, of course, is a constant, and (b) from line 116 by potentiometer 114 proportional to the increase in elevation or altitude (y) after launching. In other words, the field coils 135 are energized proportional to the combined factor $R_0+y=R$, that is, the instantaneous elevation or distance from the earth's center. Since strengthening of the field reduces the rotations per unit time of motor 137 and, conversely weakening of the field increases the rate of rotation, shaft 138 of the motor-generator combination is given a total rotation proportional to the time integral of $\dot{y}/R$ or $\omega_x$, that is, the angular distance traveled about the earth's center in the vertical plane of the trajectory or missile path; which value is transmitted by transmitter 139 over line 82 to repeater 36 of the trajectory path simulator, as previously described.

Shaft 138 also drives a generator 140 having field coils 141 with a center tap connected by lead 142 with slider 128 of potentiometer 129. An initial voltage is applied to slider 128, by means indicated at 145 in accordance with the X-component of the earth's rotation at the launching site, that is, the horizontal component of earth rotation in the vertical plane of the predetermined trajectory. This voltage may be introduced by a manually adjusted potentiometer and, of course, remains a constant value throughout the flight to the traget. Therefor e, the net voltage applied by lead 142 to field coils 135 is proportional to $\dot{x}+\dot{x}_0$ and as the generator is driven at a rate proportional to $\omega_x$, the output of the generator is proportional to the product $(\dot{x}+\dot{x}_0)\omega_x$ and is applied over line 120 to the input of amplifier 97 as a component of vertical centrifugal acceleration, as previously described.

Shaft 138 also drives another generator 143 having field coils 144 with a center tap connected by line 118 with potentiometer slider 102 of the $\dot{y}$ integrator. Therefore the output of this generator is proportional to the product $2\dot{y}\omega_x$, which is applied over line 126 to amplifier 122 as a Coriolis acceleration.

The Z-component integrators are similar in principle and operation to those just described in connection with the X-component units, so that it is sufficient to identify first amplifier 146, motor 147, generator 148, threaded shaft 150, potentiometer slider 151, and potentiometers 152 and 153, of the first or $\dot{z}$ integrator. In a manner previously explained for the other integrators, a voltage proportional to $\ddot{z}$ is fed to amplifier 146 by lead 78 which is amplified and used to effect operation of motor 147, thus driving shaft 150 and generator 148 and translating slider 151 to establish a potential at the contact of the slider engaging potentiometer 152, which is proportional to $\dot{z}$ and which is fed to second amplifier 155 by lead 156. The second integrator of the Z-component may be identical in construction with the corresponding integrator of the X-component, so that it is sufficient to identify, in addition to amplifier 155, motor 157, shaft 158, generator 159 and its field coils 160, and feed-back connection 161. As in the case of the corresponding X-component integrator, field coils 160 are energized to establish a field proportion to $(R_0+y)$, first, from source 136a, which may be from the same voltage source as that used in connection with coil 135 of the X-component integrator, and, secondly, by a lead 116a from slider 113 of the second intergator, Y-component. As the result, the rate of rotation of shaft 158 is proportional to the factor $\dot{Z}/R$ and the total rotations of the shaft are a measure of $\omega_z$, that is, the angular travel of the missile about the earth's center in the vertical plane containing the Z-axis. These rotations are transmitted by a telemetric transmitter 162 over cable connection 83 to repeater 43 of the path simulator previously described.

Shaft 158 also drives a generator 163 whose field coils 164 have a center tap connected by line 165 with one contact of slider 151, that is, the one associated with potentiometer 153. As indicated at 154, an initial voltage is applied to this contact of the slider preset in accordance with the component of earth rotation parallel with the Z-axis at the launching site so that the total applied voltage is proportional to total transverse velocity and generator 163 produces an output proportional to $\dot{z}\omega_z$ which, in a form $2\dot{z}\omega_z$, is applied by lead 121 to the input of amplifier 97 as a Coriolis acceleration.

Another generator 166 is driven by and from shaft 158 and has its field coils 167 energized over line 118 from that end of slider 102 in contact with winding 117 which, as previously described, develops a potential proportional to $\dot{y}$. As the generator is driven at a rate proportional to $\omega_z$, the output thereof is proportional to $\dot{y}\omega_z$ and is supplied over line 168 to amplifier 146 in the form $2\dot{y}\omega_z$, as a Coriolis acceleration factor.

*Operation*

The missile is provided with two external controls, namely, a center of gravity control indicated generally at 169, Figure 1, and a position control indicated at 170. The center of gravity control may consist of four relatively small reaction motors which are controlled by the path simulator by way of connections 171 and 172 and which are effective to translate the missile in any direction in the vertical plane through the center of gravity of the missile and normal to the direction of flight. The position control 170 controls the attitude of the missile with respect to its pitch, yaw, and roll axes. Control is effected by reaction motors placed so that their line of action is perpendicular to the air vanes of the missile and they may exert a force on either side of the vane. The force produced by these motors moves the missile about its pitch, yaw, and roll axes and as a secondary effect produces a force that acts in the same manner as the center of gravity control. This secondary effect is generally neglected since the magnitude of the force is usually quite small when compared with the mass of the missile. Along the longitudinal axis, and particularly at the top of the missile, no boosters are provided because they would complicate the problem of re-entry into the earth's atmosphere. Therefore, the missile cannot be accelerated in this direction. The position control may consist of several small air jets provided with air under pressure, to maintain the missile in correct position as determined by the system and conveyed as signals over lines generally identified at 173 from a repeater 174 responsive to relative pivotal movement between frame 50 and gimbal 52 about axis 86 and from repeater 175 responsive to relative pivotal movement between gimbal 52 and trunnion 56, about axis 87. As these controls are known and form no part of the present invention, they have not been described in detail.

Deviations can occur (1) if the instantaneous direction of the missile's motion is incorrect or (2) if its velocity varies from a pre-calculated value. In the first case the center of gravity control is initiated to effect the necessary change of heading while in the second case, since no propulsion means are available after cut-off of the last booster stage, the missiles trajectory is bent or deviated, as previously described.

Before launching, the latitude and longitude of the launching site and target, propulsion phase of the missile, lead angle and ballistic trajectory are, of course, known. The preliminary guide 177 is cut to great accuracy by means of an ellipsograph adjusted in accordance with characteristics of the computed ellipsoidal trajectory. The guide is mounted on slide 176, as shown in Figure 6, and pattern 19 is milled by a simultaneous start of motors 36a and 22. The pattern begins at the point of the simulated trajectory representing the point of combustion cut-off of the missile. Up to this point of the trajectory, the missile has been connected with the booster and is directed according to the launching program. However, in event that it seems advantageous to guide the booster in the second phase of its trajectory, the pattern and resulting guidance, may be extended to cover that phase.

Before launching, frame 68' and platform 59', are brought into desired angular relation by manually controlled energization of motors 67 and 71. High accuracy is not required. The reference support 59" bearing the accelerometers is leveled with a high degree of accuracy. This is done by using accelerometers 60 and 62. For this purpose these accelerometers are disconnected from computer 76 and connected to torque magnets (not shown) on the precession axes of gyros 73 and 74 controlling stabilization about the X- and Z-axes, respectively. The accelerometers will produce output signals in case the platform 59" is not horizontal and, in such a case, send their output signals to the gyros, which then precess to horizontalize the platform. By this procedure, the platform is maintained horizontal during the period immediately preceding launching so that the earth's rotation, that is, the angular change of the instantaneous vertical with respect to absolute space, does not cause an apparent tilt of the platform.

The accelerometer platform 59" is azimuthally set so that the interpivot axis between rings 59' and 64' is in the plane of the great circle course. This may be established, with great accuracy, by use of a gyroscopic compass at the launching site.

The two horizontal velocity components of the earth $\dot{X}_0$ and $\dot{Z}_0$ have to be introduced into the computer and may be calculated from the known latitude of the launching site and azimuth of the plane of the great circle trajectory path.

At take-off, the two accelerometers are electrically and automatically disconnected from the gyros and reconnected with the path computer. The computer is connected with the path simulator, the course gyro 72 on frame 68' is uncaged, and time-motor 22 of the path simulator is started.

Figure 3:
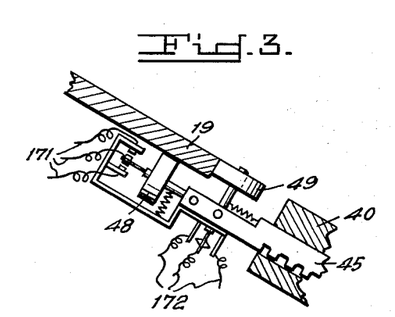
Figure 3 is a detail, to an enlarged scale, showing the pick-offs responsive to vertical and lateral deviation of the missile from the prescribed trajectory.

During flight, the actual position of the missile is continuously computed by computer 76, in conjunction with the stabilized base, as previously fully described, and the outputs used to control repeaters 36, 43 and 47. If there is no deviation of the actual instantaneous position from the pre-computed position, the feelers 48 and 49 move smoothly along pattern 19 without closure of the pick-off contacts. But should there occur a deviation between the actual and precomputed positions, one or both of the pick-off contacts will be closed and the missile controls actuated thereby to restore agreement. Thus, for example, should the missile deviate or drift laterally from the precomputed course, the repeater 43 will be actuated in a corresponding direction, to shift element 40 relatively to pattern 19. Feeler 48 will be thereby pivoted to close a corresponding one of its control contacts 171, Figure 3. The resulting energization of the missile controls will effect a lateral reaction thrust eliminating the deviation or drift and restoring the missile to the desired course.

The altimeter type modification

Figure 7:
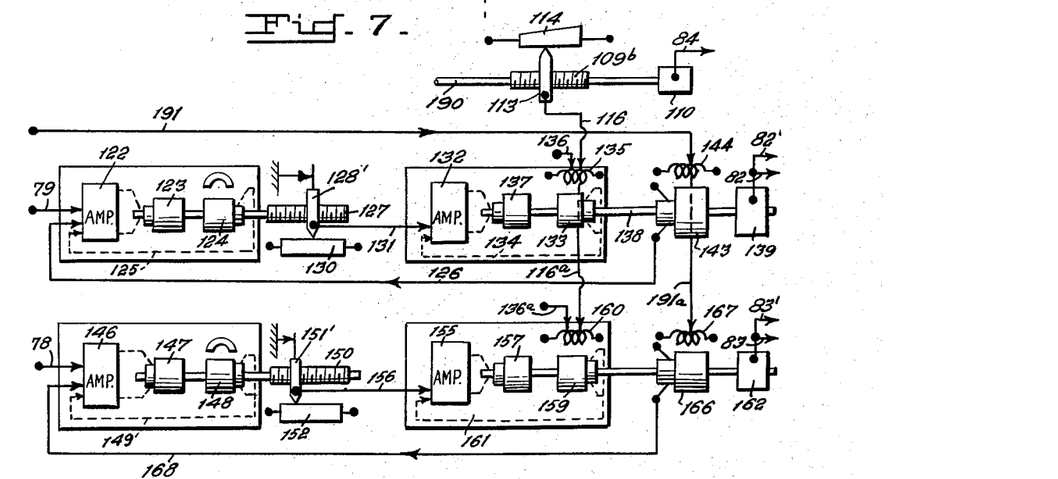
Figure 7 is a view showing schematically the path computer of an alternative form using a radar-type altimeter.

Figure 7 shows a modification wherein the Y-component of the computer is replaced by an echo-type altimeter of known construction, wherein the time for travel of high frequency pulses to the earth and reflection back to the missile, is measured as a function of altitude. In this modification, the X- and Z-components of the computer may be composed largely of the same parts as are employed in the preferred form previously described. As these parts bear the same reference numerals as have been previously used to identify and describe correspondingly numbered parts in connection with Figure 5, it is believed to be sufficient merely to explain those parts or portions of the computer which are different from the preferred form of Figure 5.

The shaft 190 is driven by follow-up mechanism (not shown), under control of an altimeter of the type mentioned in the preceding paragraph. Also this follow-up mechanism will operate or drive a rate mechanism giving an output signal of $\dot{y}$ conveyed over line 191 and extension 191a, to the field coils of generators 143 and 166 whose outputs are, therefore proportional to $\dot{y}\omega_x$ and $\dot{y}\omega_z$ as in the preferred form, and conveyed by leads 126 and 168, respectively, to amplifiers 122 and 146 as Coriolis acceleration corrections.

Shaft 190 drives screw 109b which adjusts the slider 113 of potentiometer winding 114 as in the preferred form to give an output signal proportional, to the scale of the instrument, to the total change of altitude from that at the launching site. The constant factor $R_0$, that is, the radial distance to earth's center at the launching site, is introduced by leads 136 and 136a, as in the preferred form, so that the output of generators 133 and 159 is proportional to $\omega_x$ and $\omega_z$ as previously. In all cases, the outputs from transmitters 110, 139 and 162 are as in the preferred form and are similarly applied to the driving motors or repeaters 67 and 71 of the stabilized base, and to repeaters 36, 43 and 47 of the path simulator.

With this modification, the path simulator is exactly as previously described. This is true for the stabilized base also except, of course, that the Y-axis accelerometer is omitted.

While the modification just described materially simplifies the invention, as will be realized by comparison of Figures 5 and 7, the altimeter can be jammed by enemy action. An electrical altimeter of the type mentioned measures the altitude to the earth's surface below the missile and hence delivers a picture of the earth's profile in the vertical plane of the trajectory. However, since the altitudes of flight may reach 1000 miles or more, the effects of mountain peaks are relatively insignificant. Also the great speed of the missile, together with time constants of the altimeter level out any inaccuracies or errors which might otherwise be introduced by peaks and valleys. Plateaus or highland areas present a more serious problem and should be compensated by corresponding scalar changes in the profile of the pattern 19.

In the specification and claims, the term "absolute space" means space with reference to the fixed stars.

It will thus be seen that I have provided a completely integrated self-contained guidance system for long-range high-speed missiles which is extremely sensitive and accurate. The actual instantaneous position of the missile is computed, continuously compared with the desired great-circle trajectory, and any disagreement between the two is instantaneously applied through the external controls of the missile to restore and hold it with great precision, to the pre-computed trajectory.

While I have disclosed the invention in the form now preferred by me, various modifications, rearrangements and substitutions of known equivalents, will occur to those skilled in the art, after a study of the present disclosure. Hence I wish to have it understood that the disclosure is to be taken in an illustrative rather than a limiting sense.

and that I reserve all modifications falling within the scope of the subjoined claims.

Having now fully disclosed the invention, what I claim and desire to secure by Letters Patent is:

1. A course computer for a guided missile comprising X-, Y-, and Z-components for the double integration of accelerations vectors (1) along the path of travel of the missile, (2) along a direction horizontally transverse of said path, and (3) along the instantaneous vertical of said path, respectively, each said component comprising first and second amplifiers, first and second motors each driven from the output of a respective amplifier, first and second generators each driven by a respective one of said first and second motors, first potentiometers each adjusted by and proportionately to the rotations of the respective first motors, and connections applying the output of each said first potentiometer to the input of each said second amplifier, respectively, a second potentiometer adjusted by and proportionately to the rotations of the second motor of said Y-component, connections energizing the field coils of the second generators of said X- and Z-components from the output of said second potentiometer of said Y-component, and a feed-back connection from each generator to its amplifier.

2. A course computer as recited in claim 1, two extra generators each driven by said second motors, respectively, of said X- and Z-components, connections energizing the field coils of each said two extra generators from the output of said potentiometer of the X- and Z-components, respectively, and connections feeding the outputs of said two extra generators to said first amplifier of the Y-component.

3. A course computer as recited in claim 2, a second two extra generators, each driven by a respective one of said second motors of said X- and Z-components, connections energizing the field coils of said second two extra generators from the output of said first potentiometer of the Y-component, and connections feeding the output of each of said second two extra generators to the respective inputs of the first amplifiers of the X- and Z-components.

4. In a course computer for a guided missile, comprising, X-, Y-, and Z-components for the double integration of acceleration vectors parallel to each of three mutually normal axes, respectively, each said component including first and second amplifiers, first and second motors each driven by and in proportion to the output of a respective amplifier, first and second generators each driven by a respective motor, first potentiometers each adjusted by a respective one of said first motors to produce a potential proportional to the total rotations thereof, and electrical connections between the output of each said first potentiometer and the input of the second amplifier of the respective components, a second potentiometer adjusted by said second motor of the Y-component to produce a potential proportional to total rotations of said second motor, and connections energizing the field coils of said second generators of said X- and Z-components from said second potentiometer, and feed-back connections from each generator to the input of its amplifier.

5. In a guidance system for a guided missile, a universally pivotable platform, means stabilizing said platform about three mutually normal axes, three accelerometers mounted on said platform each responsive only to X-, Y- and Z-component accelerations parallel, respectively, to (1) the instantaneous horizontal in the vertical plane through the missile path, (2) the instantaneous vertical and (3) the instantaneous horizontal normal to the aforesaid vertical plane, a computer comprising X-, Y-, and Z-units, means connecting each accelerometer to a respective unit of said computer, each said computer comprising, means for producing potentials proportional to the first and second time integrals of each input from said accelerometers, means modifying the second integral outputs of said X- and Z-units by the reciprocal of the second integral output of said Y-unit plus a constant, to produce two discrete motions proportional to angular rates of the missile about the earth's center in the aforesaid vertical plane and the instantaneous vertical plane normal thereto.

6. A guidance system as in claim 5, a path simulator, and means adjusting said simulator by and in accordance with, the said two motions.

7. In a guidance system for a guided missile, three accelerometers, means stabilizing said accelerometers to be responsive to acceleration vectors along X-, Y-, and Z-axes respectively parallel to (1) the horizontal in the vertical plane of the trajectory, (2) the instantaneous vertical, (3) the normal to said vertical plane, each said accelerometer producing a first signal proportional to its vector, first integrator means integrating each said first signal with respect to time to produce a second signal proportional to vector velocity along the respective axes, second integrator means integrating each said second signal with respect to time to produce three mechanical motions proportional to vector displacements along said respective axes, a potentiometer adjusted by said second integrating means in accordance with missile displacement along the Y-axis, means responsive to the potential of said potentiometer modifying the X-axis and Z-axis motions of said second integrator to produce motions respectively representative of angular component motions of the missile about the earth's center in the vertical planes through the X- and Z-axes, a path simulator including a model trajectory, feeler means, means responsive to the aforesaid three mechanical motions moving said feeler means generally along said model trajectory, and means responsive to any departure of said feeler means from said model trajectory to control the actual trajectory of said missile.

8. In a guidance system for a guided missile, a platform universally pivoted in said missile for movement about normally horizontal X- and Z-axes and a normally vertical Y-axis, said axes being mutually normal and concurrent, means stabilizing said platform to maintain said X-axis horizontal in the vertical plane of the trajectory, three accelerometers mounted upon said platform each producing an output voltage proportional to the acceleration components parallel to said X-, Y- and Z-axes, respectively, a computer having X-, Y-, and Z-sections, each said section comprising first and second amplifiers, first and second motors each driven from the output of a respective amplifier, first and second generators each driven by a respective motor, and first potentiometers each adjusted by a respective one of said first motors to produce a potential proportional to total rotations thereof, connections introducing the output of said potentiometers into the second amplifiers, respectively, a second potentiometer adjusted by the second motor of said Y-section to produce a potential proportional to total increase in elevation from the launching site, connections energizing the field coils of said second generators of said X- and Z-sections from the output of said second potentiometer to produce total rotations of said second motors of said X- and Z-sections proportional to angular velocities about the earth's center in the vertical planes through said axes respectively, connections introducing the output voltages of said accelerometers as an input to said first amplifiers, respectively, and course control means operated by and in response to the rotations of said second motors.

9. In a stabilizer for a guided missile, a platform, means mounting said platform for universal pivotal movement about mutually normal concurrent X-, Y-, and Z-axes, respectively parallel with (1) the horizontal direction in the vertical plane of the trajectory, (2) the vertical, and (3) the normal to said vertical plane; first, second and third motors energizable to apply torques to said platform about the respective axes, a frame, means carried by said frame stabilizing the same with respect to space external of the earth, means mounting said frame on said platform for pivotal movement about two mutually normal, normally horizontal axes, said means including two power means and irreversible drives connecting each power means to pivot said frame relatively to said platform about said two independent axes, a computer, means on said platform energizing said computer proportionally to acceleration of the missile along said X-, Y-, and Z-axes, said computer including means producing outputs proportional respectively to angular movements of said missile about the earth's center in the vertical planes through said X- and Z-axes, and means energizing said two motors from said computer outputs to thereby maintain said frame in predetermined angular relation with respect to the instantaneous horizontal plane.

10. A stabilizer as recited in claim 9, said stabilizing means comprising three independent gyroscopes carried by said frame each gyroscope precessing in response to angular movement of said platform about respective ones of said X-, Y- and Z-axes, three motors each connected to pivot said platform about respective ones of said X-, Y-, and Z-axes, and pick-offs operated by said gyroscopes, each pick-off controlling energization of a respective motor to stabilize said platform with respect to absolute space.

11. In a gyro-stabilizer for the guidance system of a guided missile, a frame, gimbal means mounting said frame for pivotal movement about successive first, second, third, fourth and fifth axes, said first axis being the inner axis and said fifth axis being the outer axis, each of said five axes being normal to the next adjacent axis of lower ordinal, reversible torque motors carried by said gimbal means connected to apply torques to said frame about said third, fourth and fifth axes, respectively, two reversible driving motors carried by said gimbal means and each connected by an irreversible drive to rotate said frame about said first and second axes, gyroscopic stabilizing means carried by said frame for precession in response to component angular movements thereof about said third, fourth and fifth axes, pick-off means fixed with said frame and operated by precession of said gyroscopic stabilizing means, and controlling connections between said pick-off means and said reversible torque motors.

12. A gyro-stabilizer as in claim 11 said gyroscopic stabilizing means comprising three two-degree-of-freedom gyroscopes each pivoted in said frame for precession in response to pivotal movement of said frame about a respective one of said third, fourth, and fifth axes and said pick-off means comprising first, second and third contact closers, said controlling connections comprising an electrical circuit between each contact closer and a respective torque motor.

13. A gyro-stabilizer as in claim 11, said gimbal means comprising first, second, third and fourth gimbal rings, successive rings being interpivoted to define said second, third and fourth axes, said frame being pivoted in said first ring to define said first axes, said first driving motor interconnecting said frame and first gimbal ring and said second driving motor interconnecting said first and second gimbal rings, said frame, first and second gimbal rings being unitarily connected when said driving motors are de-energized.

14. In a stabilizer for the guidance system of a guided missile, a frame, first, second and third, two-degree-of-freedom gyroscopes carried by said frame to precess in response to pivotal movement of said frame about a respective one of three mutually normal concurrent axes, gimbal means mounting said frame for universal pivotal movement about said three axes, three reversible torque motors each energizable to apply torques to said gimbal means and frame about a respective one of said three axes, three pick-offs each controlled by and in response to precession of a respective gyroscope, operating connections between each said pick-off and a respective torque motor, said gimbal means including inner and outer rings interpivoted on a fourth axis, said frame being pivoted on said inner ring on a fifth axis normal to said fourth axis, a first driving motor connected by an irreversible drive to pivot said outer gimbal ring about said fourth axis, and a second driving motor connected by an irreversible drive to pivot said inner gimbal ring about said fifth axis.

15. In a gyroscopic stabilizer for the guidance system of a guided missile, a frame, means mounting said frame for universal pivotal movement about three mutually normal discrete concurrent axes, torque motors respectively connected to apply correction torques about each said axis, three gyroscopes mounted on said frame for precession in response to angular movement of said frame about a respective one of said axes, and means responsive to precession of each gyroscope for energizing a respective motor to apply a torque annuling said angular movement.

16. A gyroscopic stabilizer for a guided missile, comprising a platform, gimbal means mounting said platform for pivotal movement about concurrent first, second and third discrete axes, each successive axis being normal to the preceding axis, three torque motors carried by said gimbal means, each motor being energizable to apply a torque in one direction or the other to said platform, to stabilize the same about a respective one of said axes, three two-degree-of-freedom gyroscopes, means mounting each said gyroscope on said platform for precession in response to angular movement about respective axes, pick-off means controlled by each gyroscope in response to precession thereof, and connections between said pick-off means and said motors to energize each motor from a respective gyroscope in response to precission thereof to apply torques annuling the precession.

17. In a gyroscopic system for a guided missile, a platform, gimbal means mounting said platform for pivotal movement about concurrent first, second and third axes each successive axis being normal to the preceding axis, first, second and third torque motors carried by said gimbal means, each energizable to apply a torque to said platform in one direction or the other to stabilize the same about a respective one of said axes, a frame, first, second and third gyroscopes carried by said frame for precession in response to angular acceleration of said frame about a respective one of three mutually normal axes, second gimbal means mounting said frame on said platform for angular movement about two mutually normal concurrent axes, said second gimbal means including a driving motor and irreversible drive about each said last-named two axes, pick-offs on said frame each controlled by a respective gyroscope in response to precession thereof, electrical connections between each pick-off and a respective one of said torque motors, and means energizing said driving motors at rates respectively proportional to angular movement of said missile about the earth's center in two mutually normal vertical planes, to maintain said platform in fixed angular relation with the instantaneous vertical through said missile.

18. A gyroscopic system as recited in claim 17, said last-named means including at least two accelerometers each producing an output proportional to acceleration of said missile in a respective one of said two mutually normal vertical planes, an integrating computer, connections introducing the outputs of said accelerometers into said computer, and feed-back connections from said computer to said two driving motors.

19. In a guidance system for long range guided missiles, a gyroscopic stabilizer comprising, a platform, a frame, means mounting said frame on said platform for angular movement about two concurrent mutually normal axes, first and second driving motors and irreversible power drives operable to move said frame with respect to said platform about said axes in response to energization of a respective one of said driving motors, gimbal means universally mounting said platform for angular movement about three mutually normal concurrent axes, torque motors connected with said gimbal means and energizable to apply torques to said platform and frame about said three axes, respectively, precessable gyroscopic means carried by said frame and connected with said torque motors to control the same, and means for energizing said driving motors to maintain said platform in predetermined fixed angular relation with respect to the instantaneous vertical.

20. The guidance system of claim 19, said last-named means including first and second accelerometers carried by said platform, each accelerometer being responsive to a component acceleration along two of said three mutually-normal axes, an integrating-type computer, input connections to said computer from said accelerometers, and feedback connections from said computer to said two driving motors.

21. The guidance system of claim 20, said computer comprising X- and Z-components corresponding to two of said three mutually-normal concurrent axes, each said component comprising first and second integrators in tandem, said input connections extending from each accelerometer to a respective one of said first integrators, and said feed-back connections extending from each of said second integrators to a respective one of said two driving motors.

22. The guidance system of claim 20, said computer comprising X- and Z-components computing angular movement about the earth's center in the vertical plane through the trajectory and the vertical transverse plane, respectively, each said component including first and second amplifiers, first and second motors each driven by and in proportion to the output of a respective amplifier, first and second generators each driven by a respective motor, first potentiometers each adjusted by a respective one of said first motors to produce a potential proportional to the total rotations thereof, electrical connections between each said first potentiometer and the second amplifier of the respective components, first and second generators each driven by the output of a respective one of said second amplifiers, means producing a field for each generator proportional to the radial distance of the missile from earth's center, said feed back connections extending from the output of each generator to a respective one of said two driving motors and said input connections extending from each accelerometer to the input of a respective one of said first amplifiers.

23. A stabilizer for the guidance system of a guided missile, comprising, a frame, gyroscopic stabilizer means carried by said frame, gimbal means including a platform and mounting said frame for pivotal movement about two mutually-normal discrete axes, two reversible drive motors carried by said gimbal means, each connected by an irreversible drive to pivot said frame about a respective one of said two axes, acceleration responsive means carried by said platform, a double integrating computer capable of producing output signals respectively proportional to angular movement of the missile about the earth's center in the vertical planes through said two axes, input connections to said computer from said acceleration responsive means, and feed-back connections from the output of said computer to said motors.

24. In a guided missile control system, a path computer comprising a scalar pattern having a contour representative in three dimensions of a precomputed trajectory for the missile, feeler means movable to traverse said pattern, means automatically operable to move said feeler means along and in contact with said pattern in accordance with the actual travel of the missile relatively to the earth's surface, and pick-off means responsive to any departure of said feeler means from said pattern to produce a control signal indicative of said departure.

25. A guided missile as in claim 24, said pattern having a control edge in the shape of a Keppler ellipsoid.

26. A guided missile as in claim 24, earth-simulating means, a base mounting said earth-simulating means for pivotal movement about a polar axis, and means mounting said pattern on said earth-simulating means.

27. In a control system for a guided missile, a base having bearing means defining a polar axis, earth-simulating means journaled in said bearing means, a trajectory pattern carried by said earth-simulating means and having a contour representative to scale and angular position relatively to said polar axis, of the actual trajectory relating to the earth including radial distances to earth's center, a sensitive element, means mounting said element upon said base for pivotal movement relatively thereto about mutually normal pivot axes concurrent with said polar axis at a point representative of the earth's center, power means operable to adjust said element about either or both said pivot axes, a slide carried by said element for movement radially of said point, feeler means on said slide for movement along and in contact with said pattern, power means for moving said slide toward and from said point, pick-off means carried by said slide for actuation in response to deviation of said pick-off means from predetermined position relatively to said pattern transversely and radially, and time-controlled power means rotating said earth-simulating means and pattern about said polar axis.

28. In a control for a self-contained guided missile, a base having bearing means defining a polar axis, earth-simulating means journaled in said bearing, time controlled power means rotating said earth-simulating means about said axis, a turret carried by said base for pivotal adjustment about a first equatorial axis normal to and concurrent with said polar axis, at a point representing the earth's center, a yoke mounted in said turret for angular adjustment about a second equatorial axis normal to said first axis through said point, a part journaled in said slide on a third axis normal to said second equatorial axis through said point, an element pivoted on said part for pivotal movement about a fourth axis normal to said third axis through said point, a pattern having a cam edge representative to scale and angular position relatively to said polar axis, of the actual trajectory relatively to the earth, including radial distances from earth's center a slide carried by said element for sliding toward and from said point, feeler means carried by said slide for movement in contact with and along said cam edge, second power means energizable to pivot said part relatively to said yoke, third power means energizable to pivot said element relatively to said part, fourth power means energizable to move said slide relatively to said element, and means responsive to actuation of said pick-off means for controlling said missile.

29. A control as in claim 28, and means computing the actual instantaneous position of said missile in flight over the earth's surface and controlling said second, third and fourth power means.

30. In a guided missile control, a pattern having a guide surface representative to scale of the pre-computed trajectory including radial distances to earth's center, an earth-simulator, mounted for pivotal movement about a polar axis, said pattern being fixed to said earth simulator relatively to said polar axis, in the same angular relation as the actual trajectory relatively to the earth's polar axis, pick-off means, means mounting said pick-off means for movement over and along said pattern in accordance with, and responsive to, the angular movement of the missile about the earth's center, power means for so moving said pick-off means, a computer having outputs energizing said power means, means responsive to acceleration of the missile energizing said computer, means stabilizing said means responsive to acceleration, and means for correcting the course of said missile in response to any actuation of said pick-off means by said pattern.

31. In a self-contained automatic-control for a guided missile, an earth simulator, means mounting said simulator for rotation about a polar axis, time controlled power means for so rotating said simulator, a pattern having a cam surface representative to scale of the actual precomputed trajectory of the missile including radial distances from earth's center, means fixedly mounting said pattern on said simulator in the same angular and scalar spatial relation as the actual trajectory bears to the true earth, pick-off means, means mounting said pick-off means for angular movement about a point on said polar axis, in two mutually normal axes concurrent at a point with said polar axis, and for translation toward and from said point, power drives energizable to individually so angularly move and translate said pick-off means, a gyroscopically-stabilized base, accelerometers mounted on said base responsive to component accelerations of said missile along three concurrent mutually-normal axes one of which coincides with the instantaneous vertical and another of which is horizontal in the vertical plane of the trajectory, a computer, input connections to said computer from said accelerometers, said computer including means effecting double integration of inputs from said accelerometers to produce signals proportional to spatial displacement of the missile along said mutually-normal axes, connections applying each said signal to a respective one of said power drives of said earth-simulator means, and circuits under control of said pick-off means for correcting the course of said missile.

32. That method of guiding a long-range missile from launching site to target comprising, continuously computing the displacement of the missile along three mutually-normal axes with respect to the launching site and one of which is the vertical plane of the trajectory, to determine the actual spatial position of the missile over and with respect to the earth's surface, continuously comparing said computed position with respect to a pre-formed scalar pattern of the desired trajectory, detecting any divergence between the actual and computed instantaneous positions in each of said planes separately, and utilizing any such divergence to actuate controls restoring the missile to desired trajectory.

33. That method of guiding a long-range self-contained missile from launching site to target along a trajectory lying in the plane containing launching site, target and earth's center, comprising, integrating the acceleration components of motion of said missile along each of three mutually-normal axes two of which are the instantaneous vertical and horizontal through the missile in said plane to produce signals proportional to velocity components along said axis, integrating said velocity component signals to give signals proportional to displacement from launching site of the missile along said axes, utilizing said displacement components to continuously represent to scale the actual spatial position of said missile over earth's surface, continuously comparing said spatial position with a contour to scale of a desired precomputed trajectory, detecting any divergency between said actual and pre-computed positions along three mutually normal axes representative of said first-named three axes, and utilizing any such divergency to control the missile to restore it to position in and along said precomputed trajectory.

34. In a guidance system for a long-range guided missile, a pattern having a guide surface simulating to scale a portion of the trajectory of the missile, means mounting said pattern in the same angular relation, relatively to a simulated polar axis of rotation as the actual trajectory bears to the earth's polar axis, means rotating said pattern about said simulated polar axis at the rate of 15° per hour, feeler means, means mounting said feeler means for rotation about two discrete axes concurrent at a point with said simulated polar axis, and for translation radially of said point, power means energizable to so rotate and translate said feeler means in guided movement along and relatively to said pattern surface, a stabilized base, accelerometer means carried in angularly-stabilized position by said stabilized base for producing signals responsive to and proportional to, accelerations of said missile along (a) the horizontal in the vertical plane of the trajectory, (b) a line normal to said plane and (c) the instantaneous vertical in said plane, means doubly integrating and modifying, said signals to produce resultant signals representative of anglar travel about the earth's center in the vertical planes of (a) and (b) and the total translation along (c), means applying said resultant signals to respective units of said power means, circuit closers responsive to relative lateral and radial displacement between said feeler means and pattern, and control circuits for said missile including said circuit closers.

35. In a system for guiding a long-range missile along an ellipsoidal trajectory in the plane determined by launching site, target, and earth's center, comprising, stabilized means sensing the acceleration of said missile along each of three mutually-normal concurrent axes, a first of which is the instantaneous horizontal in said plane, a second of which is the normal to said plane, and a third of which is the instantaneous vertical through the missile, means separately and doubly integrating each said acceleration with respect to time to give first and second values proportional to total distance traveled in the respective vertical planes through said first and second axes and a third value proportional to total distance traveled along said third axis, means algebraically adding the total distance traveled along said third axis to the predetermined radial distance from launching site to earth's center to give a third value proportional to instantaneous distance from earth's center, means dividing each said first and second values by said third value to give two resultant values proportional to total angular distance traveled in said first and second planes about earth's center, and means mechanically reproducing and utilizing said two resultant values and said third value to guide said missile along said trajectory.

36. The system recited in claim 35, said last-named means including means representing the earth's polar axis, a three-dimensional cam having an edge simulating the trajectory and rotatable about said axis in the same angular relation as the actual trajectory bears to the earth's polar axis, and pick-off means movable over and along said edge in response to said two resultant values and said third value to detect any deviation between the actual and computed trajectories.

References Cited in the file of this patent
UNITED STATES PATENTS

| | | |
|---|---|---|
| 2,109,283 | Boykow | Feb. 22, 1938 |
| 2,266,449 | Ullrich et al. | Dec. 16, 1941 |
| 2,444,933 | Jasperson | July 13, 1948 |
| 2,503,346 | Meredith | Apr. 11, 1950 |
| 2,513,537 | Williams | July 4, 1950 |
| 2,532,402 | Herbold | Dec. 5, 1950 |

FOREIGN PATENTS

| | | |
|---|---|---|
| 925,105 | France | Apr. 25, 1949 |